United States Patent
Jeong

(10) Patent No.: US 6,291,950 B1
(45) Date of Patent: Sep. 18, 2001

(54) MOTOR DRIVE SYSTEM WITH VARIABLE GAIN

(75) Inventor: Dong-Youl Jeong, Kyungki-do (KR)

(73) Assignee: Fairchild Korea Semiconductor Ltd. (KR)

( * ) Notice: Subject to any disclaimer, the term of this patent is extended or adjusted under 35 U.S.C. 154(b) by 0 days.

(21) Appl. No.: 09/590,324

(22) Filed: Jun. 8, 2000

(30) Foreign Application Priority Data

Jul. 8, 1999 (KR) .................................................. 99-27547

(51) Int. Cl.[7] ........................................................ H02P 6/02
(52) U.S. Cl. ........................ 318/254; 318/138; 318/439; 318/245; 318/560
(58) Field of Search ................................. 318/138, 245, 318/254, 439, 696, 609, 610, 268, 283–284, 560, 561; 360/73, 77.75, 78.12

(56) References Cited

U.S. PATENT DOCUMENTS

| | | |
|---|---|---|
| 4,415,844 | * 11/1983 | Mendenhall et al. . |
| 4,639,798 | * 1/1987 | Harrison et al. . |
| 5,010,282 | * 4/1991 | Moberg . |
| 5,838,515 | * 11/1998 | Mortazavi et al. . |
| 5,952,798 | * 9/1999 | Jones et al. . |
| 6,008,603 | * 12/1999 | Jones et al. . |
| 6,020,700 | * 2/2000 | Tien . |

* cited by examiner

*Primary Examiner*—Paul Ip
(74) *Attorney, Agent, or Firm*—Blakely Sokoloff Taylor & Zafman

(57) ABSTRACT

Disclosed is a motor drive system comprising a control voltage output portion receiving a first control voltage and a second control voltage from an external servo, and outputting a voltage that is proportional to a difference between the first and second control voltages; a driver receiving the voltage output from the control voltage output portion via a non-inversion terminal and receiving feedback signals through an inversion terminal to generate drive signals for a motor; a commutation distributor outputting ON/OFF signals such that the motor is optimally driven, the ON/OFF signals being output according to hole signals of each phase of the motor that are input externally; a power transistor, which is ON/OFF controlled according to an output of the driver to supply the drive signals to the motor; an output current detector detecting the drive signals output from the power transistor and converting the drive signals into a voltage, and outputting an output voltage; and a voltage amplifier, a voltage gain of which is varied by an external pin, the voltage amplifier amplifying the output voltage of the output current detector to supply the voltage as the feedback signals to the driver.

6 Claims, 3 Drawing Sheets

MOTOR DRIVE SYSTEM WITH VARIABLE GAIN

BACKGROUND OF THE INVENTION (a) Field of the Invention

The present invention relates to a motor drive system. More particularly, the present invention relates to a motor drive system for a CD-ROM spindle motor, the motor drive system having a variable gain.

(b) Description of the Related Art

A three-phase BLDC (brushless direct current) motor is generally used as the spindle motor in a CD-ROM. An output torque of the BLDC motor is proportional to a current flowing to a motor load. To control rpm, the spindle motor includes a system that frequently detects an output current such that the output current can be controlled to a level proportional to an input control voltage.

SUMMARY OF THE INVENTION

It is an object of the present invention to provide a motor drive system for a CD-ROM spindle motor in which a gain of the motor drive system can be easily varied.

To achieve the above object, the present invention provides a motor drive system comprising a control voltage output portion receiving a first control voltage and a second control voltage from an external servo, and outputting a voltage that is proportional to a difference between the first and second control voltages; a driver receiving the voltage output from the control voltage output portion via a non-inversion terminal and receiving feedback signals through an inversion terminal to generate drive signals for a motor; a commutation distributor outputting ON/OFF signals such that the motor is optimally driven, the ON/OFF signals being output according to hole signals of each phase of the motor that are input externally; a power transistor, which is ON/OFF controlled according to an output of the driver to supply the drive signals to the motor; an output current detector detecting the drive signals output from the power transistor and converting the drive signals into a voltage, and outputting an output voltage; and a voltage amplifier, a voltage gain of which is varied by an external pin, the voltage amplifier amplifying the output voltage of the output current detector to supply the voltage as the feedback signals to the driver.

According to a feature of the present invention, the control voltage output portion comprises a transconductance amplifier receiving the first and second control voltages from the external servo, and outputting a current proportional to a difference between the first and second control voltages; an absolute value circuit obtaining an absolute value from the current output from the transconductance amplifier, and outputting a corresponding output current; and a current/voltage converter for converting the output current of the absolute value circuit to a voltage.

According to another feature of the present invention, the current/voltage converter includes a resistor, a first end of the resistor being connected to an output of the absolute value circuit and a second end of the resistor being grounded.

According to yet another feature of the present invention, the voltage gain of the voltage amplifier is varied by a voltage applied to the external pin.

According to still yet another feature of the present invention, the output current detector includes a sensing resistor, the sensing resistor converting the drive signals output from the power transistor into a voltage.

According to still yet another feature of the present invention, a resistance value of the sensing resistor is changed to vary transmission characteristics of the entire system.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
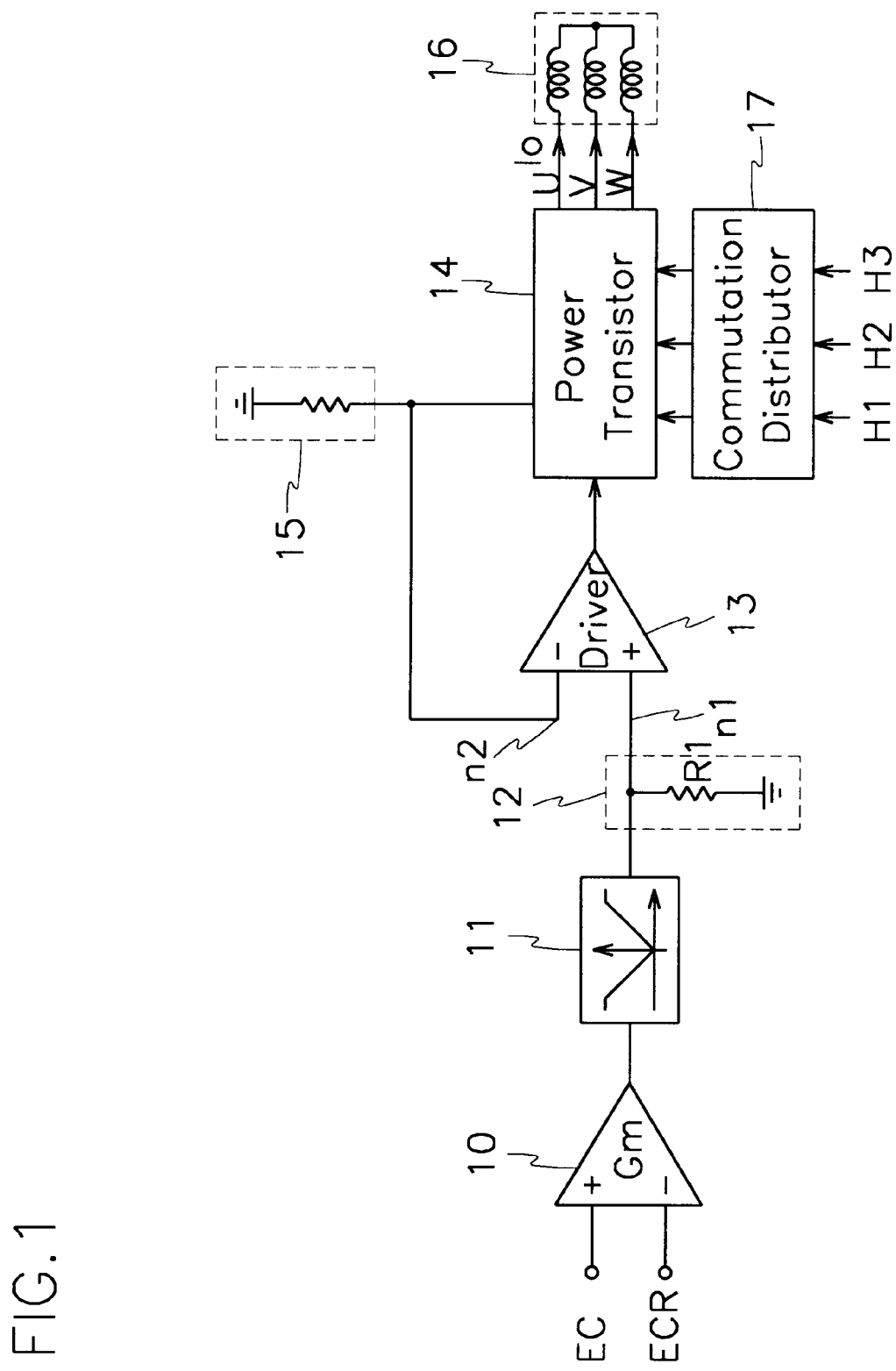
FIG. 1 is a schematic diagram of a motor drive system for controlling a rpm of a spindle motor according to a first preferred embodiment of the present invention.

FIG. 1 shows a schematic diagram of a motor drive system for controlling an rpm of a spindle motor according to a first preferred embodiment of the present invention.

Control input voltages EC and ECR are input from a servo, the control input voltages EC and ECR functioning to control rpm. A sign of a difference in the control input voltages EC and ECR (i.e., positive or negative) determines a rotational direction of the spindle motor. The control input voltages EC and ECR are output as current through a transconductance amplifier 10. In order to continuously supply sourcing or sinking current without relation to the sign of the difference in the control input voltages EC and ECR so that drive current is supplied to a motor 16 with respect to a forward or reverse direction of the spindle motor, the current from the transconductance amplifier 10 passes through an absolute value circuit 11, then through a current voltage converter 12 to enter a positive input terminal of a driver 13. The current voltage conversion is realized by a resistor R1 in the current/voltage converter 12, the resistor R1 being connected between a ground and a positive input node n1 of the driver 13. The voltage results in a value as shown in Equation 1 below.

$$Vn1 = GmR1 \vert EC - ECR \vert \qquad \text{Equation 1}$$

A commutation distributor 17 generates ON/OFF signals of a power transistor 14 according to hole input signals H1, H2 and H3 so that rpm of a maximum torque results for the motor 16. The driver 13 supplies drive signals to the power transistor 14 such that a three-phase output current U, V, W is supplied to the motor 16.

At this time, the current U, V, W supplied to the motor 16 is converted to a voltage through an output current detecting circuit 15, then input through a negative input terminal of the driver 13, thereby forming a negative feedback loop. A motor drive current of an output end becomes proportional to the difference in the control input voltages EC and ECR by the negative feedback loop such that an rpm speed of the motor 16 is controlled.

Further, the output current detecting circuit 15 detects a current supplied to the power transistor 14 (i.e., a current supplied to the motor 16). A sensing resistor Rs is provided in the output current detecting circuit 15, the sensing resistor Rs being connected to a ground and acting to convert the current to a voltage.

A voltage of an input node n2 of the driver 13 is expressed as Vn2= IoRs. Since a difference in voltage between the input terminals of the driver 13 becomes zero because of the negative feedback loop, that is, since a voltage Vn1 of the positive terminal of the driver 13 comes to equal a voltage Vn2 of the negative terminal of the driver, the following equation is established.

$$GmR1 vert EC-ECR vert = IoRs \qquad \text{Equation 2}$$

A transfer function (i.e., a gain GM) is obtained from Equation 2.

$$GM = Io/vert EC-ECR vert = GmR1/Rs \qquad \text{Equation 3}$$

Figure 2A:
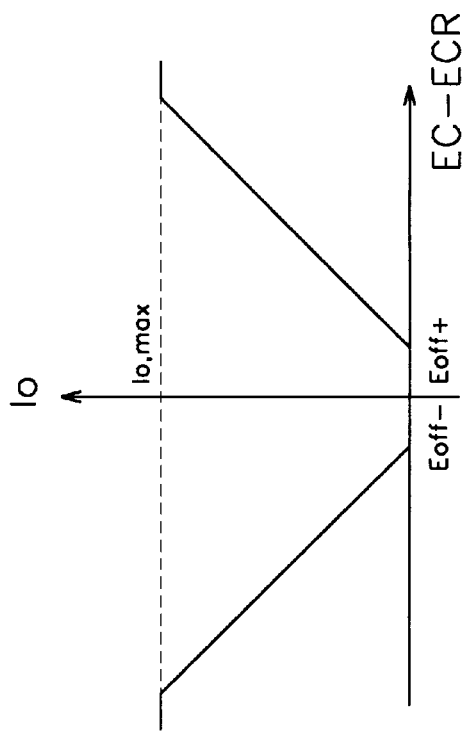
FIG. 2a is a graph of a theoretical transfer function of the motor drive system shown in FIG. 1.

Gain characteristics of Equation 3 are shown in FIG. 2a.

FIG. 2a shows a graph of a theoretical transfer function of the motor drive system of the present invention. As shown in the drawing, the motor drive current Io is proportional to the control input voltages EC and ECR.

Figure 2B:
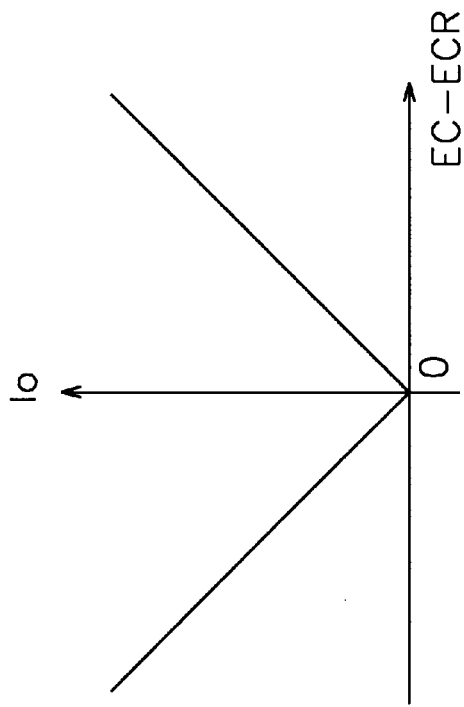
FIG. 2b is a graph of an actual transfer function of the motor drive system shown in FIG. 1.

However, the actual resulting transfer function of the motor drive system of the present invention is shown in FIG. 2b. As shown in the drawing, a center and both ends of the plot of the actual transfer function are flat. This is a result of offset voltages Eoff+ and Eoff- being set such that the motor 16 does not rotate when the difference in the control input voltages EC and ECR is zero. That is, only when the difference in the control input voltages EC and ECR is greater than the offset voltages Eoff+ and Eoff-, is current supplied to the motor 16 to operate the same. Further, since the motor 16 becomes damaged if more current than is required is supplied to the motor 16, a maximum value of the output current Io is set as Io.max as shown in FIG. 2b.

However, the transfer function characteristics of the motor drive system of the first preferred embodiment of the present invention are difficult and expensive to change. Accordingly, in a motor drive system of a second preferred embodiment of the present invention, a voltage amplifier, in which a voltage gain can be simply adjusted by external pins, is provided in a feedback input terminal of a driver. With such changes, transmission characteristics of the entire system can be easily adjusted.

Figure 3:
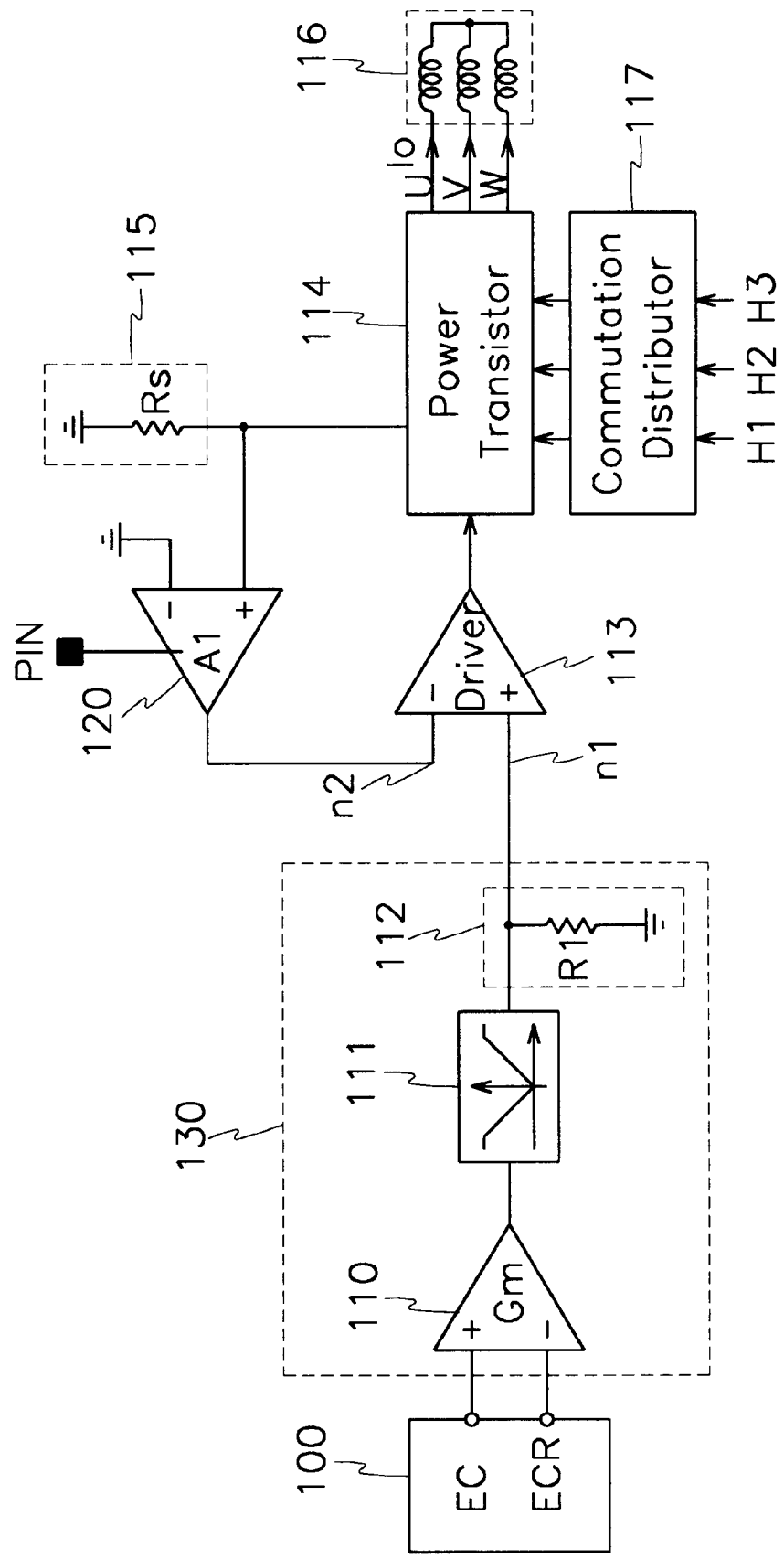
FIG. 3 is a schematic diagram of a motor drive system for controlling a rpm of a spindle motor according to a second preferred embodiment of the present invention.

FIG. 3 shows a schematic diagram of a motor drive system for controlling an rpm of a spindle motor according to a second preferred embodiment of the present invention.

As shown in the drawing, the motor drive system of the second preferred embodiment of the present invention comprises a control voltage output portion 130, the control voltage output portion 130 including a transconductance amplifier 110, an absolute value circuit 111, and a current/voltage converter 112; a driver 113; a commutation distributor 117; a power transistor 114; an output current detecting circuit 115; and a voltage amplifier 120.

To convert an output current of the absolute value circuit 111 of the control voltage output portion 130 into a voltage, the current/voltage converter 112 of the control voltage output portion 130 includes a resistor R1, a first end of which is connected to the absolute value circuit 111 and a second end of which is grounded.

The voltage amplifier 120 varies a voltage gain according to a voltage input to an external pin of the voltage amplifier 120, and amplifies an output voltage of the output current detecting circuit 115, after which a resulting voltage is output to an inversion terminal of the driver 113. The output current detecting circuit 115 converts a current output from the power transistor 114 using a sensing resistor Rs.

An operation of the motor drive system of the second preferred embodiment of the present invention will now be described.

First, the motor drive system begins to operate when the user turns on the power. After the motor drive system starts its operation, control input voltages EC and ECR are input to the transconductance amplifier 110 from an external servo 100. A sign of a difference in the control input voltages EC and ECR (i.e., positive or negative) determines a rotational direction of the spindle motor.

Next, the transconductance amplifier 110 outputs a voltage which is proportional to the difference between the control input voltages EC and ECR. This current is converted to an absolute value in the absolute value circuit 111 according to a forward or reverse rotational direction of the spindle motor such that a drive current is supplied to a motor 116.

Subsequently, the output current of the absolute value circuit 111 flows via the resistor R1 of the current/voltage converter 112. At this time, a voltage Vn1 of an input node n1 is input through a non-inversion terminal of the driver 113. That is, the conversion from current into voltage is realized by the resistor R1, which is connected between a ground and the input node n1 of a positive terminal of the driver 113. The voltage results in a value as shown in Equation 1.

The commutation distributor 117 generates ON/OFF signals of the power transistor 114 according to hole input signals H1, H2 and H3 so that rpm of a maximum torque results for the motor 116. Also, the driver 113 supplies drive signals to the power transistor 114 such that a three-phase output current U, V, W is supplied to the motor 116.

At this time, the current U, V, W supplied to the motor 116 is converted to a voltage through the output current detecting circuit 115, then input through a negative input terminal of the driver 113 after the voltage is amplified by the voltage amplifier 120, thereby forming a negative feedback loop. Here, the output current detecting circuit 115 detects a current supplied to the power transistor 114 (i.e., a current supplied to the motor 116). The sensing resistor Rs is provided in the output current detecting circuit 115, the sensing resistor Rs being connected to a ground and acting to convert the current to a voltage. As a result of the negative feedback loop, a motor drive current of an output end becomes proportional to the difference in the control input voltages EC and ECR such that an rpm speed of the motor 116 is controlled.

A voltage of an input node n2 of the driver 113 is expressed as Vn2=IoRs. Since a difference in voltage between the input terminals of the driver 113 becomes zero because of the negative feedback loop, that is since a voltage Vn1 of the positive terminal of the driver 113 comes to equal a voltage Vn2 of the negative terminal of the driver, the following equation is established.

$$GmR1 vert EC-ECR vert = IoRsA1 \qquad \text{Equation 4}$$

A transfer function (i.e., a gain GM) of the motor drive system of the second preferred embodiment of the present invention is obtained from Equation 4.

$$GM = Io/vert EC-ECR vert = GmR1/RsA1 \qquad \text{Equation 5}$$

Accordingly, by simply adjusting a voltage gain A1 of the voltage amplifier 120 externally, transmission characteristics (GM) of the motor drive system can be varied.

In the above, the voltage amplifier 120 is described as capable of varying the voltage gain according to the voltage applied to the external pin. However, it is also possible to perform this function using an equivalent device.

Because the gain Gm of the transconductance amplifier 110 and a value of the resistor R1 are fixed, it is possible to change a value of the sensing resistor Rs in order to adjust the transmission characteristics of the system. However, in this method, since a large current flows to the sensing resistor Rs, a resistor having a high power rating and undergoing minimal changes in a resistor value must be used, resulting in an increase in costs. Hence, by adjusting the voltage gain A1 of the voltage amplifier 120 externally (by the external pin), a low-cost, simple method of varying transmission characteristics (GM) of the motor drive system is realized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A motor drive system comprising:
   a control voltage output portion receiving a first control voltage and a second control voltage from an external servo, and outputting a voltage that is proportional to a difference between the first and second control voltages;
   a driver receiving the voltage output from the control voltage output portion via a non-inversion terminal and receiving feedback signals through an inversion terminal to generate drive signals for a motor;
   a commutation distributor outputting ON/OFF signals such that the motor is optimally driven, the ON/OFF signals being output according to hole signals of each phase of the motor that are input externally;
   a power transistor, which is ON/OFF controlled according to an output of the driver to supply the drive signals to the motor;
   an output current detector detecting the drive signals output from the power transistor and converting the drive signals into a voltage, and outputting an output voltage; and
   a voltage amplifier, a voltage gain of which is varied by an external pin, the voltage amplifier amplifying the output voltage of the output current detector to supply the voltage as the feedback signals to the driver.

2. The motor drive system of claim 1 wherein the control voltage output portion comprises:
   a transconductance amplifier receiving the first and second control voltages from the external servo, and outputting a current proportional to a difference between the first and second control voltages;
   an absolute value circuit obtaining an absolute value from the current output from the transconductance amplifier, and outputting a corresponding output current; and
   a current voltage converter for converting the output current of the absolute value circuit as a voltage.

3. The motor drive system of claim 2 wherein the current/voltage converter includes a resistor, a first end of the resistor being connected to an output of the absolute value circuit and a second end of the resistor being grounded.

4. The motor drive system of claim 1 wherein the voltage gain of the voltage amplifier is varied by a voltage applied to the external pin.

5. The motor drive system of claim 1 wherein the output current detector includes a sensing resistor, the sensing resistor converting the drive signals output from the power transistor into a voltage.

6. The motor drive system of claim 5 wherein a resistance value of the sensing resistor is changed to vary transmission characteristics of the entire system.

* * * * *